United States Patent [19]
Nakatani et al.

[11] Patent Number: 6,065,578
[45] Date of Patent: May 23, 2000

[54] PRESSURE PLATE FOR FRICTION CLUTCH

[75] Inventors: Seiji Nakatani; Michiharu Yokoi, both of Aichi, Japan

[73] Assignee: Aisin Seiki Kabushiki Kaisha, Kariya, Japan

[21] Appl. No.: 08/448,638

[22] Filed: May 23, 1995

[30] Foreign Application Priority Data

May 25, 1994 [JP] Japan .................................. 6-111404

[51] Int. Cl.$^7$ ................................................ F16D 13/70
[52] U.S. Cl. .................................. 192/107 R; 192/70 B; 192/70.14; 192/109 R
[58] Field of Search ........................ 192/107 R, 70.13, 192/70.14, 109 R

[56] References Cited

U.S. PATENT DOCUMENTS

| | | | |
|---|---|---|---|
| 2,902,130 | 9/1959 | Halberg et al. | 192/107 R |
| 3,221,853 | 12/1965 | Batchelor et al. | 192/107 R X |
| 3,850,277 | 11/1974 | Adachi | 192/107 R X |
| 4,020,937 | 5/1977 | Winter | 192/107 R |
| 5,123,511 | 6/1992 | Beccaris | 192/70.13 |
| 5,127,504 | 7/1992 | Beccaris | 192/70.13 |

FOREIGN PATENT DOCUMENTS 1-210620  8/1989  Japan .

*Primary Examiner*—Charles A. Marmor
*Assistant Examiner*—Saúl Rodríguez
*Attorney, Agent, or Firm*—Burns, Doane, Swecker & Mathis, LLP

[57] ABSTRACT

The pressure plate for use in a friction clutch is characterized in that the first plate 11 and second plate 12 thereof are respectively composed of divided plates, fins 12b are respectively formed in the second plates 12 such that they are integral with their respective plates 12, and the second plates 12 are disposed on the first plates 11 in such a manner that gaps between the first plates are not aligned with gaps between the second plates.

10 Claims, 5 Drawing Sheets

FIG. 2
FIG. 3
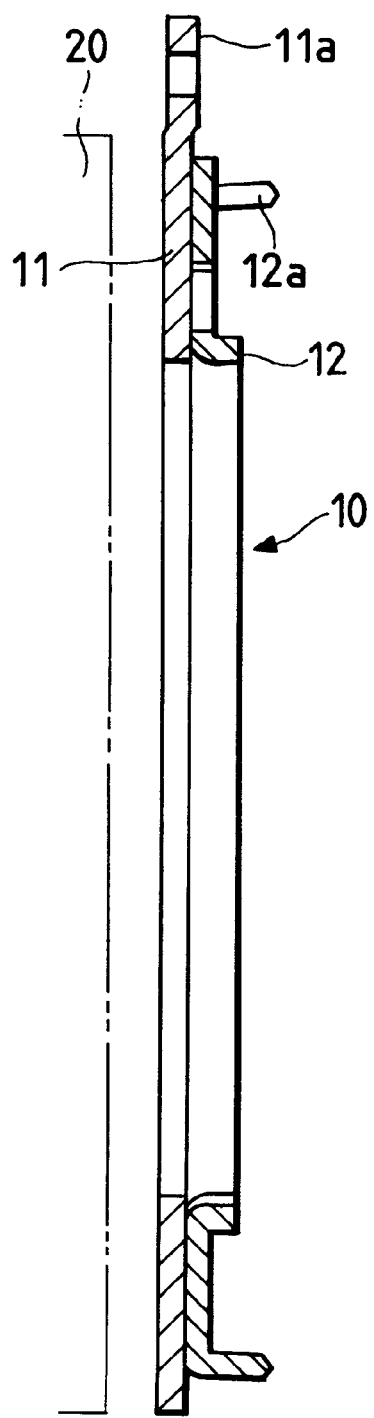
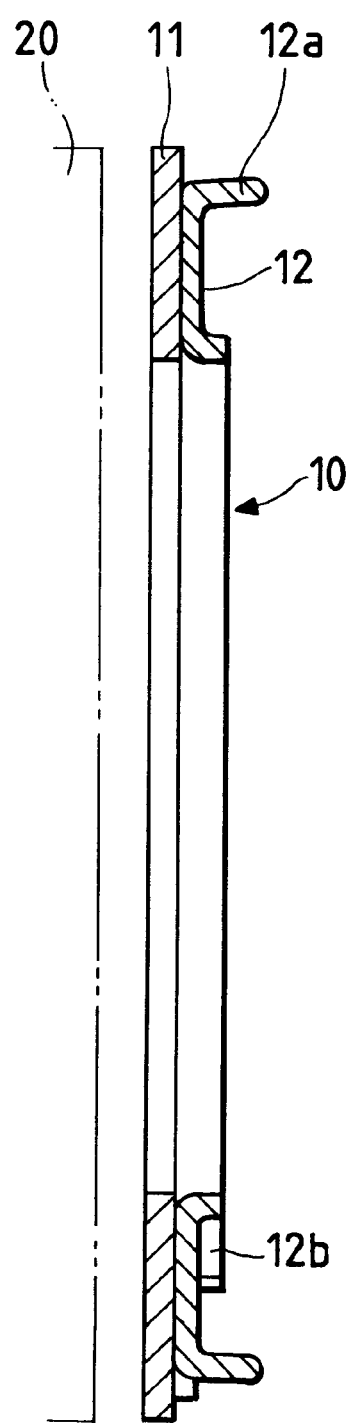

FIG. 5
FIG. 6
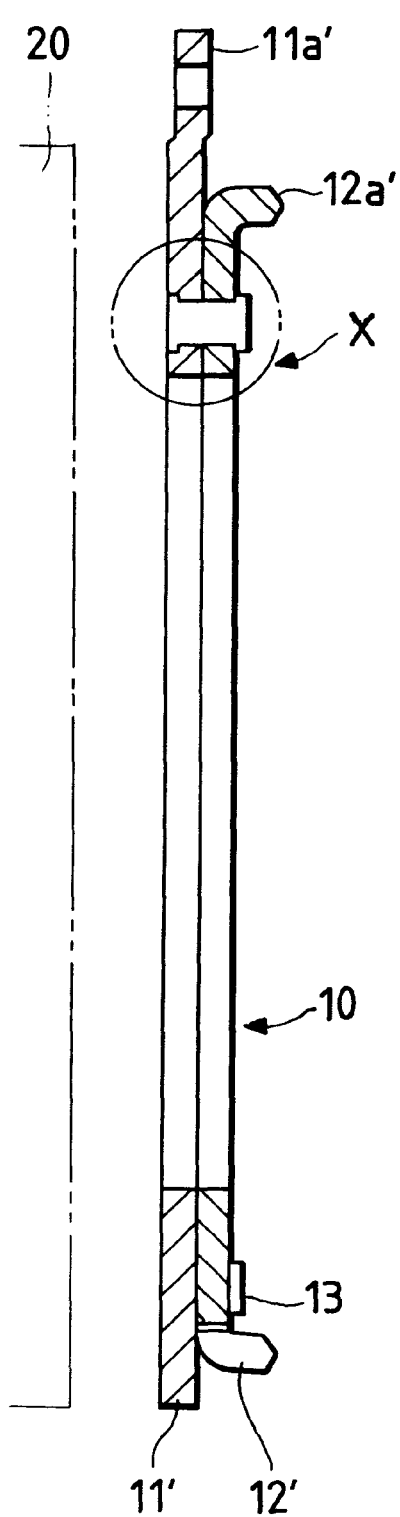
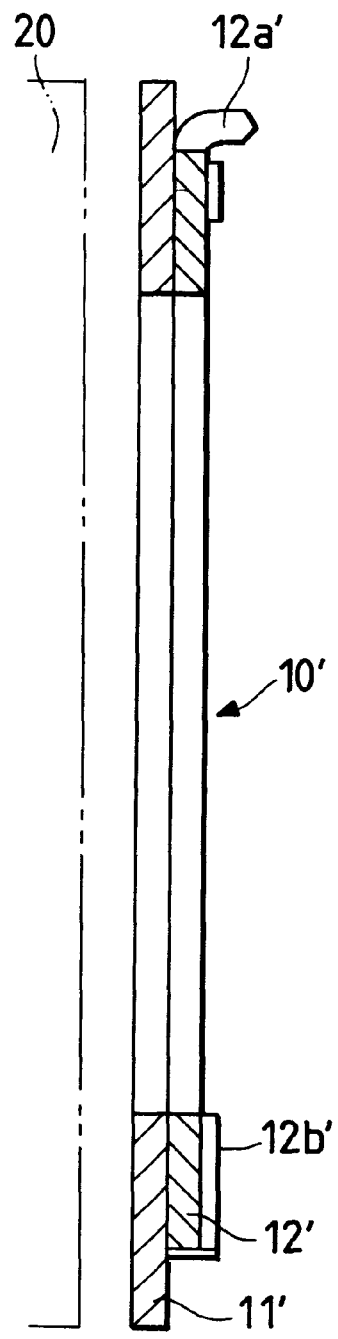

PRESSURE PLATE FOR FRICTION CLUTCH

DETAILED DESCRIPTION OF THE INVENTION

1. Field of the Invention

The present invention relates to a pressure plate for use in a friction clutch.

2. Description of the Related Art

As a conventional pressure plate for use in a friction clutch, there is known a pressure plate which is disclosed in Japanese Patent Unexamined Publication No. Hei 1-210620. As shown in FIG. 10, the pressure plate disclosed therein is of a pressure plate 100 including a friction surface which can be frictionally contacted with a clutch disk if it is energized by an energizing member. In particular, the pressure plate 100 includes two projecting portions 101 which are respectively bent formed in such a manner that they project in the axial direction of the pressure plate 100, and the pressure plate 100 is structured such that it can be pressed against a clutch disk 102 if the projecting portions 101 are energized by an energizing member.

In the above-mentioned prior art, the pressure plate 100 is formed by pressing and bending the outer end portion of a steel plate. However, since the pressure plate 100 is formed by working or punching the steel plate out into a substantially annular shape, the yield of the material of the pressure plate is very poor and thus the manufacturing cost of the product is high. Also, although it is possible to reduce ill effects such as thermal deformation due to friction heat and the like by increasing the thickness of the pressure plate 100, it is difficult to bend and form the thickness-increased pressure plate 100 and, especially, it is very difficult to bend and form such thick pressure plate 100 while securing the friction area thereof to be in friction contact with the clutch disk 102. In this case, if the friction area of the pressure plate 100 is secured by a well-known pressing operation, then the main body of the pressure plate 100 becomes large and thus its associated clutch cover becomes large in size, which provides a problem when it is installed in a vehicle. Also, it can be expected that the friction area of the pressure plate 100 can be secured by minimizing the radius of curvature of the bent portion thereof but, in this case, however, there is necessary a special bending operation, which results in the increased costs.

SUMMARY OF THE INVENTION

In view of the above conventional circumstances, it is an object of the invention to provide a pressure plate for use in a friction clutch which can improve the yield of the material and can be pressed easily.

In attaining the above object, according to a first aspect of the invention, there is provided a pressure plate for use in a friction clutch which comprises a ring-shaped first plate providing a friction surface to be in friction contact with a clutch disk and a plurality of fan-shaped second plates respectively fixed to the first plate and including support portions, the support portions respectively being formed integrally with the respective second plates, while the plurality of second plates are disposed on the circumference of the first plate.

Also, according to a second aspect of the invention, there is provided a pressure plate for use in a friction clutch which comprises a plurality of fan-shaped first plates respectively providing friction surfaces to be in friction contact with a clutch disk and disposed in a circumferential shape, and a plurality of fan-shaped second plates respectively to be disposed on the first plates and including support portions and disposed in the first plates, the support portions being formed integrally with their respective second plates, while the first and second plates are connected with each other such that the first and second plates alternate each other in the circumferential direction of the pressure plate and there are formed gaps between the mutually adjoining first plates.

Further, according to a third aspect of the invention, three is provided a pressure plate for use in a friction clutch which comprises one or more pressed projections formed axially in the first plate(s) and through holes respectively formed in the second plates to allow the pressed projection(s) to extend through the second plates, whereby the first and second plates are connected with each other through the pressed projection(s).

According to the pressure plate for use in a friction clutch in the first aspect of the invention, if the support portions of the second plates thereof are pressed by an energizing member, then the first plate thereof fixed integrally to the second plates are also pressed and thus the pressure plate is frictionally contacted with the clutch disk, so that a drive force can be transmitted to the clutch disk. And, since the plurality of second plates are disposed on the first plate, the yield of the material of the pressure plate is improved, which in turn can reduce the cost of the pressure plate. Also, because the pressure plate is composed of the first and second plates, one of them can be used as a friction surface which presses against the clutch disk, thereby being able to secure a sufficient friction area without requiring any bending operation. And, as the other plate can be used as a support portion which supports the energizing member, the pressure plate can be formed in a thin steel plate, so that the pressure plate can be press worked easily. Further, due to the fact that the fin portions respectively formed integrally with the second plates are able to cool heat radiated from the first plate by means of rotation of the pressure plate and also that the fin portions are respectively formed integrally with the second plates, there is eliminated the need to provide the fin portions afterward, which can reduce the cost of the pressure plate.

According to the pressure plate for use in a friction clutch in the second aspect of the invention, if the support portions of the second plates thereof are pressed by an energizing member, then the first plates thereof fixed integrally to the second plates are also pressed and thus the pressure plate is frictionally contacted with the clutch disk, so that a drive force can be transmitted to the clutch disk. Since the plurality of first plates are disposed in a circumference, the yield of the material of the pressure plate can be further improved, which results in the reduced cost of the pressure plate. Also, because the first and second plates are connected with each other so that the first and second plates alternate each other in the circumferential direction thereof and also because there are formed gaps respectively between the mutually adjoining first plates, there is allowed thermal deformation due to friction heat, which can reduce ill effects on the whole pressure plate.

According to the pressure plate in the third aspect of the invention, the pressed projection(s) to be formed in the first plate(s) and the through holes to be formed in the second plates can be formed integrally by press working, and the first and second plates are connected with each other by means of the pressed projections. This can reduce the man-hours necessary for production of the pressure plate, which in turn can reduce the cost of the pressure plate.

The above and other objects and features of the present invention will be more apparent from the following description taken in conjunction with the accompanying drawings.

BRIEF DESCRIPTIO OF THE DRAWINGS

FIG. 2 is a section view of the first embodiment, taken along the line I—I shown in FIG. 1;

FIG. 3 is a section view of the first embodiment, taken along the line II—II shown in FIG. 1;

FIG. 5 is a section view of the second embodiment, taken along the line V—V shown in FIG. 4;

FIG. 6 is a section view of the second embodiment, taken along the line VI—VI shown in FIG. 4;

DETAILED DESCRIPTION OF THE PREFERRED EMBODIMENTS

Now, description will be given below of a first embodiment of a pressure plate for use in a friction clutch according to the invention with reference to FIGS. 1 to 3.

Figure 1:
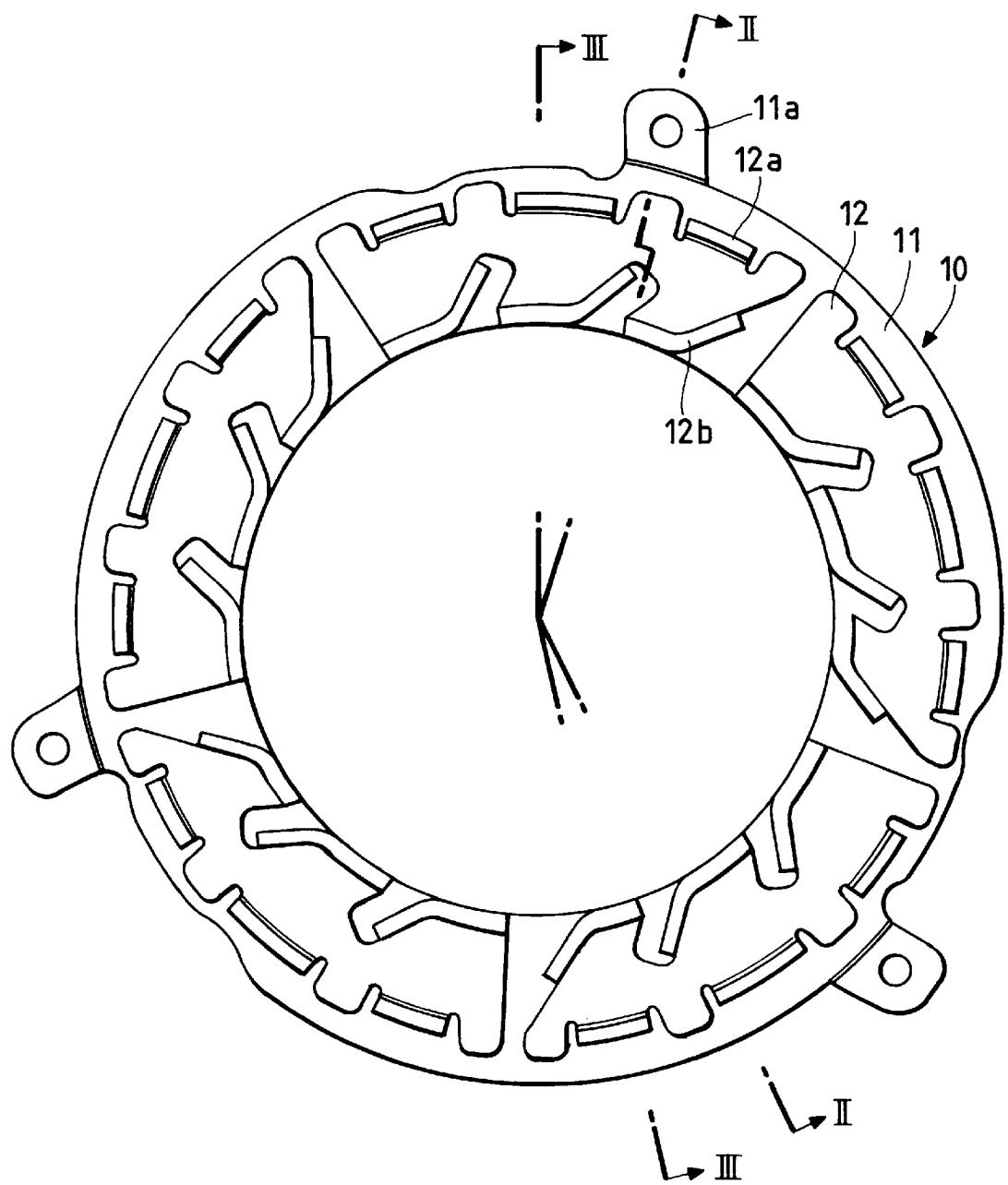
FIG. 1 is a front view of a first embodiment of a pressure plate according to the invention.

As shown in FIG. 1, a pressure plate 10 for use in a friction clutch includes a first plate 11 for pressing against a clutch disk 20 and a plurality of second plates 12 respectively connected to the first plate 10.

A clutch device includes a pressure plate 10 for engaging and disengaging a clutch disk 20 disposed on the output shaft (not shown) side with and from a flywheel (not shown) disposed in an input shaft (not shown), a diaphragm spring (not shown) for pressing against the pressure plate 10, a clutch cover (not shown) for storing therein the pressure plate 10 and diaphragm spring, and a clutch release bearing (not shown) for pressure removing and shifting the diaphragm spring. The clutch cover is fixed to the flywheel on the input shaft side. The mounting portions 11a of the pressure plate 10 are respectively supported through straps (not shown) by the clutch cover in such a manner that they are free to move in the axial direction of the pressure plate 10. The diaphragm spring is mounted on the clutch cover and is supported in such a manner that it is free to shift with a pivot ring (not shown) as a fulcrum. The clutch release bearing is movable in the axial direction thereof, is disposed on the output shaft such that it is free to move in the axial direction, and is in contact with the diaphragm spring.

As shown in FIG. 1, the second plate 12 is comprised of a plurality of steel plates which are respectively disposed on the first plate 11 and connected to the first plate 11 by welding.

Each of the second plates 12 includes a fin 12b which has an inner peripheral end bent formed in the axial direction thereof, while one end of the fin 12b is bent from the circumferential direction thereof to almost the radial direction thereof. The fin 12b generates a cooling wind by means of the rotation of the pressure plate 10 to thereby enhance the cooling effect of the pressure plate 10. Also, the outer end portion of the second plate 12 is bent formed in the axial direction of the second plate 12 and is used as a support portion 12a for supporting the diaphragm spring. Further, in the illustrated embodiment, the second plate 12 is divided into five, but the number of divisions is not limited to a special number.

Now, description will be given below of a second embodiment of a pressure plate for use in a friction clutch according to the invention with reference to FIGS. 4 to 7.

Figure 4:
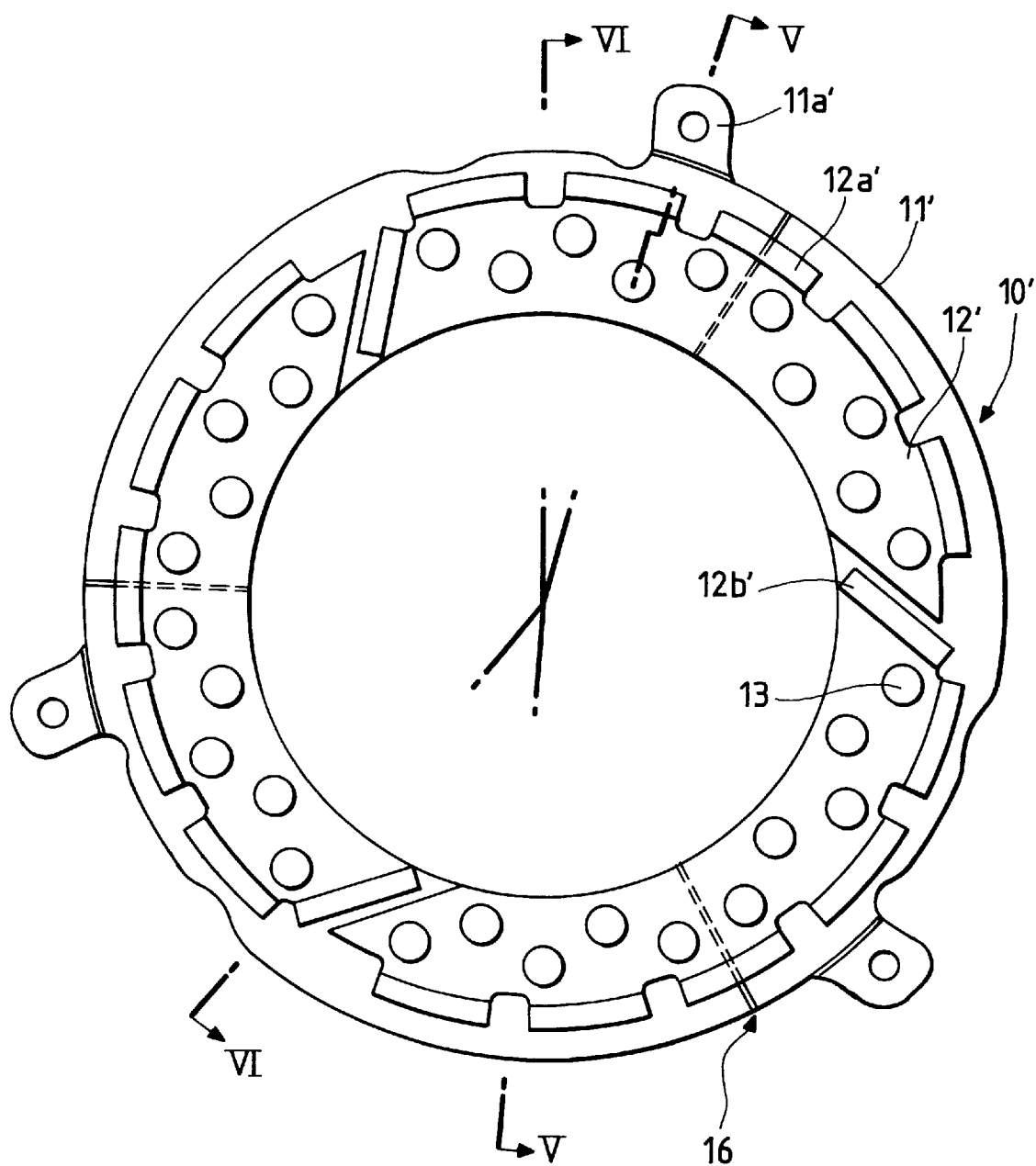
FIG. 4 is a front view of a second embodiment of a pressure plate according to the invention.
Figure 7:
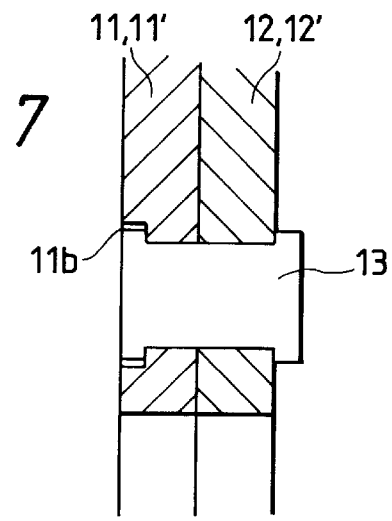
FIG. 7 is a detailed view of an X portion shown in FIG. 5.

As shown in FIG. 4, other components than a first plate 11' are similar to those employed in the first embodiment and thus the description thereof is omitted here.

As shown in FIG. 4, the first plate 11' is formed of a plurality of steel plates which are spaced a given gap 16 from one another. Second plates 12' are respectively disposed such that they alternate on the first plates 11' in the circumferential direction thereof and are staked and fixed to the first plates 11' by rivets 13. The gaps between the first plates 11' allow the heat deformation of the plates due to friction heat, which prevents the heat deformation of the whole pressure plate 10'. Also, if a thermal spraying material (to be described later) is thermally sprayed into a hole portion 11b in which the head portion of the rivet 13 is stored, then clogging can be prevented.

Since the first and second plates 11' and 12' are respectively divided, the yield of the material can be further improved and thus the cost of the pressure plate 10' can be reduced. Also, in the second embodiment, the plates are divided into three but, similarly to the first embodiment, the number of divisions is not limited to a special number.

In the first and second embodiments, the support portions 12a, 12a' of the second plates 12, 12' are bent formed in the axial direction. However, this is not limitative but, alternatively, the axially bent formed support portions 12a, 12a' can be rolled up onto and fixed to the first plates 11, 11'. This makes up for the insufficient strength of the support portions due to the thin-made second plates 12, 12' for facilitating the press working thereof, while the rolled-up portions are used as the support portions 12a, 12a'.

Now, description will be given below of a third embodiment of a pressure plate for use in a friction clutch according to the invention.

Figure 8:
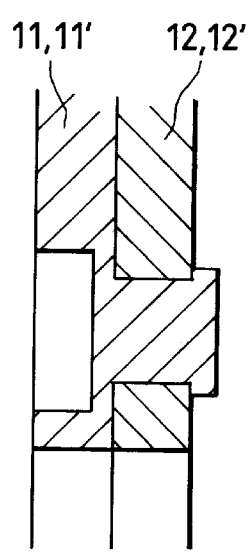
FIG. 8 is a detailed view of the X portion shown in FIG. 5.
Figure 9:
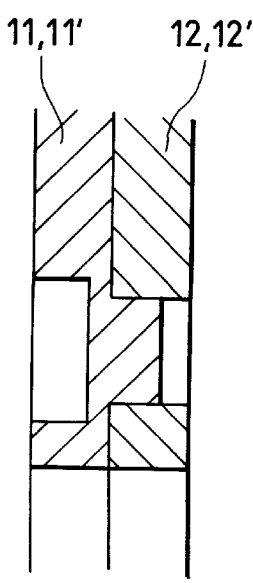
FIG. 9 is a detailed view of the X portion shown in FIG. 5.
Figure 10:
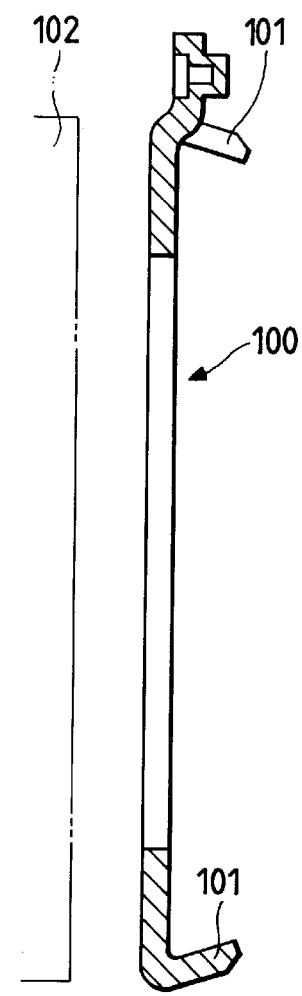
FIG. 10 is a section view of a conventional pressure plate for use in a friction clutch.

Here, description will be given below of another method of connecting the first plates 11, 11' with the second plates 12, 12' employed in the first and second embodiments. As shown in FIGS. 8 and 9, there are provided in the first plates 11, 11' pressed projections which can be formed integrally with the first plates 11, 11' by press working. Also, there are formed through holes in the second plates 12, 12'. The pressed projections are respectively engaged into the through holes and the pressed projections are then staked and fixed thereto, so that the first plates 11, 11' can be respectively connected to the second plates 12, 12'. Alternatively, as shown in FIG. 9, the pressure plate can be used while the pressed projections are in engagement with the through hole and, in this case, it is preferable to secure the connection strength of the first and second plates in the circumferential direction thereof in combination of rivets staking or pressed projections staking. As described above, since the pressed projections can be provided when the pressure plate is worked by pressing, there can be eliminated the labor and time for providing the pressed projections afterwards by welding or rivet staking, which in turn can reduce the cost of the pressure plate.

Here, the number of fins 12, 12b' may be preferably set so that it is as small as possible and the maximum cooling efficiency can be obtained. That is, the number of fins 12b, 12b' should be selected such that it fits the pressure plates 10, 10'.

Also, if some thermal spraying material is thermally sprayed onto the friction surface of the first plates 11, 11' of the first and second embodiments, then a sufficient friction characteristic can be secured to thereby prevent an increase in the wear of the clutch disk and the like, decrease in the transmission torque, and generation of vibrations and strange noise during the clutch engagement.

According to the pressure plate for use in a friction clutch in the first aspect of the invention, provision of a plurality of second plates on the first plate improves the yield of the material thereof to thereby be able to reduce the cost of the pressure plate. Also, since the pressure plate is composed of two kinds of plates, that is, first and second plates, one of them can be used as a friction surface for pressing against a clutch disk, which makes it possible to secure a sufficient friction area without requiring bending formation. Further, since the other plate can be used as a support portion for supporting an energizing member, the pressure plate can be made thin, which can facilitate the press working of the pressure plate. Moreover, because a fin portion is formed integrally with the second plate, there is eliminated the need for providing the fin portion afterward, thereby being able to reduce the cost of the pressure plate.

According to the pressure plate for use in a friction clutch in the second aspect of the invention, since a plurality of first plates are disposed on a circumference, the yield of the material thereof is further improved and thus the cost thereof can be reduced. Also, because the first and second plates are connected with each other such that they alternate each other in the circumferential direction thereof and also because there are formed gaps between the first plates, the thermal deformation of the first plates due to friction head is allowed, which in turn can minimize the effects of the thermal deformation on the whole pressure plate.

According to the pressure plate for use in a friction clutch in the third aspect of the invention, the pressed projections to be formed in the first plates and the through holes to be formed in the second plates can be formed integrally with their respective plates by press working, and the first and second plates are connected with each other by staking and fixing the pressed projections, which can reduce the man-hours necessary for production of the pressure plate and thus can reduce the cost of the pressure plate.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. A pressure plate for use in a friction clutch, comprising:
   a ring-shaped first plate having a friction surface for frictionally contacting a clutch disk; and
   a plurality of fan-shaped second plates circumferentially disposed with respect to said first plate, each respective fan-shaped second plate having at least one support portion, said support portions being formed integrally with said respective second plates.

2. A pressure plate as claimed in claim 1, wherein said plurality of second plates are coupled to said first plate by welding.

3. A pressure plate as claimed in claim 1, wherein each of said fan-shaped second plates has at least one fin for cooling said first plate, and said fin is formed integrally with said respective second plates.

4. A pressure plate as claimed in claim 3, wherein said fin has an inner peripheral end formed by bending said second plate in the axial direction thereof, said fin having another end that is formed by bending said second plate from the circumferential direction thereof to the substantially radial direction thereof.

5. A pressure plate for use in a friction clutch as claimed in claim 1, wherein said ring-shaped first plate is comprised of a plurality of first plates, said first plates including axially disposed pressed projections which each extend through a hole in one of the second plates, said first and second plates being connected to one another by the pressed projections.

6. A pressure plate for use in a friction clutch, comprising:
   a plurality of fan-shaped first plates each having a friction surface for frictionally contacting a clutch disk and disposed in a circumference; and
   a plurality of fan-shaped second plates each having at least one support portion integrally formed with a respective second plate, said first and second plates being connected with each other in such a manner that gaps are provided between said first plates, said second plates being disposed with respect to the first plates so that the gaps between the first plates are spanned by one of the second plates.

7. A pressure plate as claimed in claim 6, wherein said second plates are staked and fixed to said first plates by rivets.

8. A pressure plate for use in a friction clutch as claimed in claim 6, wherein said first plates include pressed projections formed in the axial direction thereof, said second plates respectively include through holes through which said pressed projections are inserted so as to extend through said second plates, and said first and second plates are connected with each other by said pressed projections.

9. A pressure plate for use in a friction clutch as claimed in claim 6, wherein each of said fan-shaped second plates has at least one fin for cooling the second plate.

10. A pressure plate for use in a friction clutch as claimed in claim 9, wherein said fin has an inner peripheral portion formed by bending said second plate in the axial direction thereof, said inner peripheral portion having one end that is formed by bending said second plate from the circumferential direction thereof to the substantially radial direction thereof.

* * * * *